March 8, 1932.  G. V. JEFFERSON  1,848,349
CIRCUIT CONTROLLER
Filed June 18, 1930   2 Sheets-Sheet 1

INVENTOR:
G. V. Jefferson,
BY A. R. Vincill
His ATTORNEY

March 8, 1932.                G. V. JEFFERSON                1,848,349
                              CIRCUIT CONTROLLER
                       Filed June 18, 1930        2 Sheets-Sheet 2

INVENTOR:
G. V. Jefferson,
BY
His ATTORNEY

Patented Mar. 8, 1932

1,848,349

UNITED STATES PATENT OFFICE

GLEN V. JEFFERSON, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

CIRCUIT CONTROLLER

Application filed June 18, 1930. Serial No. 462,064.

My invention relates to circuit controllers, and particularly to circuit controllers which are designed for operation by railway switches.

I will describe one form of circuit controller embodying my invention, and will then point out the novel features thereof in claims.

Figure 1:
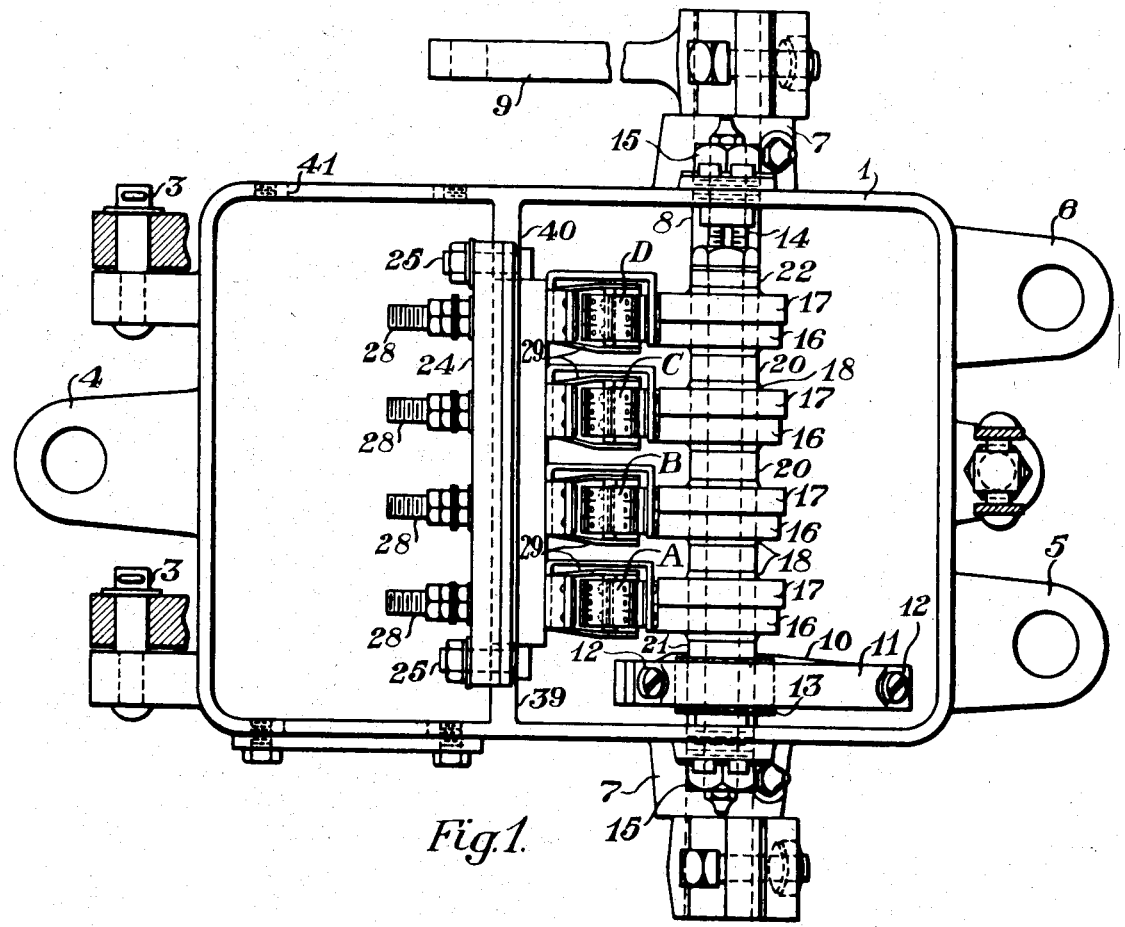
Figure 2:
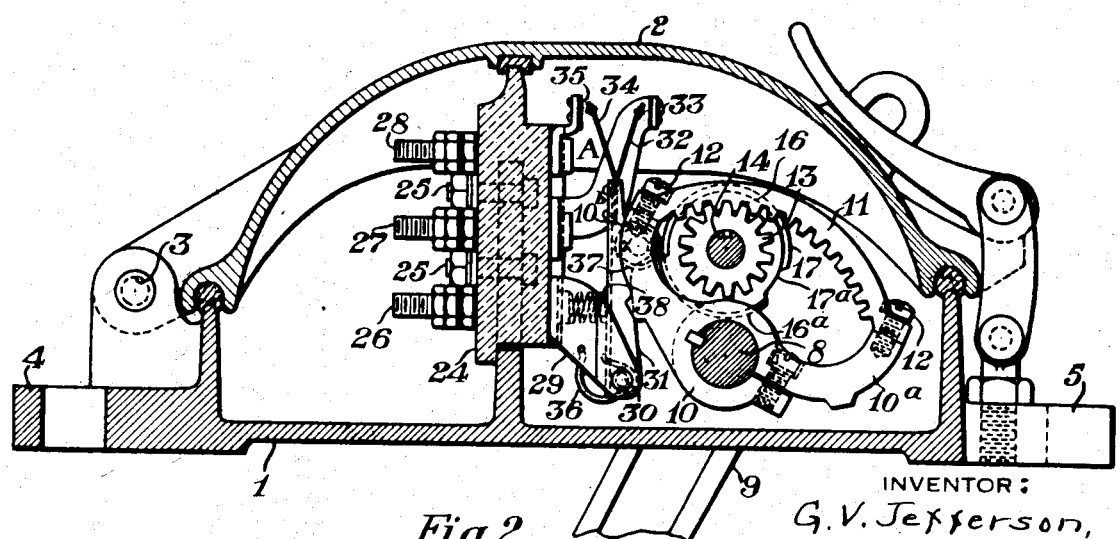
Figure 3:
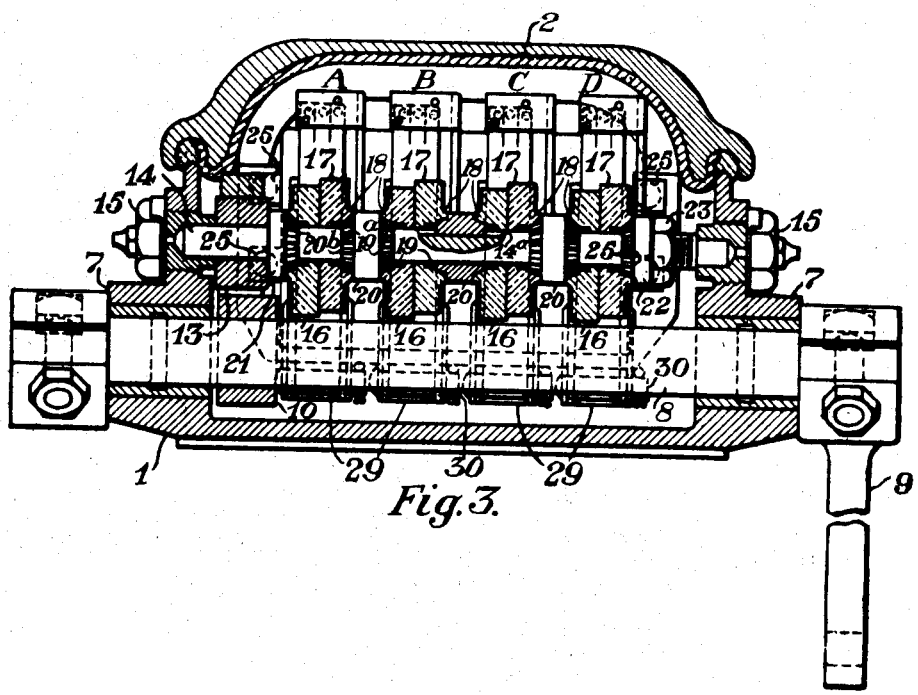
Figure 4:
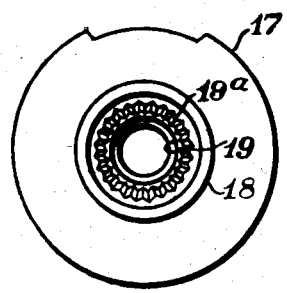
Figure 5:
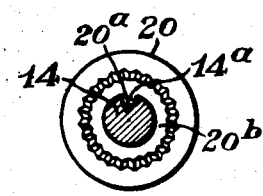

In the accompanying drawings, Fig. 1 is a top plan view, showing one form of circuit controller embodying my invention with the cover for the casing removed to illustrate the construction. Fig. 2 is a vertical sectional view of the circuit controller shown in Fig. 1. Fig. 3 is a transverse vertical sectional view of the circuit controller shown in Fig. 1. Fig. 4 is a detail view showing, in side elevation, one of the cams 17 forming a part of the circuit controller illustrated in Figs. 1, 2 and 3. Fig. 5 is a detail view showing the cam shaft 14 and one of the driving collars 20 forming a part of the circuit controller illustrated in Figs. 1, 2 and 3.

Similar reference characters refer to similar parts in each of the several views.

Referring first to Figs. 1, 2 and 3, the reference character 1 designates a casing which houses the operating mechanism of the circuit controller. The casing 1 is provided with a cover 2 which is hinged to the casing at 3, and with apertured lugs 4, 5 and 6 by means of which the casing may be fastened to any suitable support or standard.

Journaled in bushed bearings 7, 7 located in the opposite side walls of the casing 1 is a main operating shaft 8 which may be oscillated by means of a crank 9 attached to one of its outer ends. The crank 9 may be operated by any desired means such, for example, as by the movable rails of a railway switch.

Fixed to the shaft 8 on the inside of the casing 1, as best seen in Fig. 2, is a bracket 10 provided with two upwardly extending arms 10ª and 10ᵇ. An internal gear segment 11 is secured to the upper ends of these arms by means of bolts 12, and this segment meshes with a pinion 13 which is rigidly fastened to a cam shaft 14 journaled in removable bearings 15, 15 screwed into the side walls of the casing 1 directly above the bearings 7, 7. The gear ratio of the segment 11 and pinion 13 may be any suitable value, but will preferably be such that rotation of the main operating shaft 8 through a comparatively small angle will rotate the cam shaft 14 through a comparatively large angle.

The cam shaft 14 carries a plurality of cams which, as here shown, are arranged in four groups located at spaced points along the shaft, and each of which groups comprises a pair of cams 16 and 17. These cams may be fastened to the cam shaft in any suitable manner, but for reasons which will appear hereinafter, it is highly desirable that the cams of each pair may be quickly and conveniently adjusted angularly with respect to each other and to the cam shaft, and I therefore prefer to fasten the cams to the cam shaft in the following manner:

As here shown, each cam is mounted loosely on the cam shaft and is provided on the side which is farthest away from the other cam of the same pair with a boss 18 having a central bore 19. Each of these bores is tapered, as shown in Fig. 3, and has formed on its entire circumference serrations or teeth 19ª as illustrated in Fig. 4. A driving collar 20 having an inwardly extending projection or feather key 20ª which is of the proper size to fit slidably in a key way 14ª, formed lengthwise of the cam shaft 14 (see Fig. 5), is located between each adjacent pair of cams 16 and 17, and each of these collars is provided with two oppositely disposed hubs 20ᵇ. Each of these hubs is tapered to fit the bore 19 in the boss of the adjacent cam 16 or 17 and is provided on its periphery with teeth which match the teeth on the circumference of the cooperating bore. Two other driving collars 21 and 22 are located on the cam shaft adjacent the two end cams 16 and 17, respectively. These collars are similar to the collars 20 with the exception that each of these collars is provided with only one hub which fits into the tapered bore in the adjacent cam. The cams and collars are clamped together on the cam shaft 14 by means of a nut 23 which is screwed onto the threaded right-hand end of the cam shaft as viewed in Fig. 3, the pinion 13 at the opposite end of the shaft serving as an abutment to limit the motion of the cams and collars toward the left-hand end of the shaft when the nut is tightened. With the cams fastened to the cam shaft in this manner, it will be apparent that in order to adjust the angular position of any cam 16 or 17 with respect to the other cam of the same pair or with respect to the shaft, it is only necessary to back off the nut 23 a sufficient distance so that the teeth on the circumference of the bore of such cam may be disengaged from the teeth on the co-operating hub of the associated driving collar, turn the cam to the desired position, and again tighten the nut. The adjusted cam will then be held in its adjusted position because of the co-action between the teeth on the cooperating hub of the associated collar and the teeth on the circumference of the bore in the cam. The cams are utilized to operate the contacts of the controller, which contacts I will now describe.

The contacts of the controller are mounted on a panel 24 of insulating material which is secured by means of bolts 25 to two ribs 39 and 40 projecting from the sides of the casing 1. As here shown, there are four groups of contacts, designated by the reference characters A, B, C and D, respectively, one such group cooperating with each pair of cams 16 and 17. All of these groups are the same and a description of one will therefore suffice for all.

Referring to the group A, for example, this group comprises a plurality of terminal posts 26, 27 and 28, each comprising as usual a machine screw passing through a hole in the panel 24, and one or more nuts on the screw. Secured to the panel by means of the post 26 is a forked bracket 29, the panel being recessed to receive the abutting portion of the bracket so that the bracket is prevented from turning. The arms of the bracket 29 extend downwardly and away from the panel, and are provided, adjacent their lower ends, with a pin 30 on which is pivoted, a channel shaped vertically extending contact arm 31. Riveted to the upper end of this arm are two flexible contact fingers 32 and 34 which co-operate in a manner to be described hereinafter with two fixed contact members 33 and 35, respectively. The fixed contact member 33 is secured to the panel 24 by means of the terminal post 27, and the fixed contact member 35 is secured to the panel by means of the terminal post 28, suitable recesses being provided in the panel to hold these members in proper alignment on the panel. Good electrical connection between the arm 31 and the bracket 29 is insured by a flexible connector 36 which is soldered to both the arm and the bracket.

Each arm 31 is arranged to be operated by the associated pair of cams 16 and 17 and, for this purpose, each arm is provided with a roller 37 which cooperates with the peripheries of these cams. Each arm is biased toward the cams by a spring 38 and it will be apparent, therefore, that the rollers follow the peripheries of the cams as the latter oscillate.

As best seen in Fig. 2, each of the cams 16 and 17 is substantially circular, but the cams 17 are larger in diameter than the cams 16. The periphery of each of the smaller cams 16, however, is provided with a swell $16^a$ which projects beyond the edge of the adjacent large cam 17 when the cams are fastened to the shaft, while the periphery of each large cam 17 is provided with a recess $17^a$, the bottom of which lies flush with the main edge of the adjacent cam 16. The parts are so proportioned that when the roller 37 of one of the contact arms 31 is on the main edge of the associated cam 17, as shown in Fig. 2, the contact arm occupies a middle position in which both of the contact fingers 32 and 34 carried thereby are out of engagement with the associated fixed contacts 33 and 35, respectively. When the roller 37 of a contact arm rides up on the swell $16^a$ of the associated cam 16, however, the contact arm is forced toward the left to a position in which the finger 34 carried thereby engages the associated fixed contact member 35 to close a contact 34—35; and, when the roller 37 of a contact arm enters the recess $17^a$ in the associated cam 17, the arm is forced to the right by the spring 38 to a position in which the finger 32 carried thereby engages the associated fixed contact 33 to close a contact 32—33. For convenience, I will term the contacts 34—35 the normal contacts and the contacts 32—33 the reverse contacts.

The wires for connecting the circuit controller into the circuits which it is desired to control by the circuit controller may be brought into the casing 1 through a suitable aperture 41 located in the side wall of the casing.

The operation of the circuit controller as a whole is as follows: When the parts are in the positions shown in Fig. 2, the crank 9 is a short distance from the end of its stroke in the clockwise direction of rotation, and the roller 37 of each contact arm 31 then bears on the edge of the associated cam 17, so that the normal contacts 34—35 and reverse contacts 32—33 of the circuit controller are all open. If, now, the crank is rotated in a clockwise direction to the end of its stroke, cam shaft 14 will be rotated in the same direction to a position in which the roller 37 on each contact arm 31 will ride up on the swell $16^a$ of the associated cam 16, and the normal contacts 34—35 of the circuit controller will therefore all become closed. If the crank 9 is rotated in a counter-clockwise direction from the position shown to the other end of its stroke, however, the cam shaft 14 will then be rotated in a counter-clockwise direction to a position in which the roller 37 of each contact arm 31 will enter the notch 17ª in the associated cam 17, and the reverse contacts 32—33 of the circuit controller will become closed.

It will be seen from the foregoing that one set of contacts is operated when the cams are in one extreme position, and another set of contacts is operated when the cams are in another extreme position, and that the angular distance between these two extreme positions must therefore be constant. It follows that if the strokes of all switches were the same, the same angular adjustment of the cams could be used for all switches. As a matter of fact, however, the strokes of all switches are not alike and it is for this reason that it is desirable to adjust the angular position of the cams with respect to the cam shaft. This adjustment may be made in the manner previously described.

If it is desired that the normal or reverse contacts of the circuit controller should become closed at some other position or positions in the stroke of the operating crank than its extreme positions, this operation may be obtained by shifting the relative positions of the cams of each pair with respect to each other or to the cam shaft until the de-desired operation is obtained, as will be readily understood from an inspection of the drawings.

One advantage of a circuit controller embodying my invention is that a large number of contact combinations may be obtained by the employment of only two types of cams 16 and 17, respectively.

Another advantage of a circuit controller embodying my invention is that since the cam shaft is geared to the operating shaft in the manner described, a large movement of the cam shaft and, hence, a positive operation of the contacts may be obtained in response to a comparatively small movement of the main operating shaft, thus insuring positive operation of the circuit controller in response to a small movement of the switch or other device with which it may be connected.

Another advantage of a circuit controller embodying my invention is that it may be turned around end for end without necessitating any change within the controller itself, and in either position of the circuit controller the operating crank may be placed on the most convenient end of the shaft.

Although I have herein shown and described only one form of circuit controller embodying my invention, it is understood that various changes and modifications may be made therein within the scope of the appended claims without departing from the spirit and scope of my invention.

Having thus described my invention, what I claim is:

1. A circuit controller comprising a main operating shaft, a cam shaft geared to said main operating shaft, two substantially circular cams of different diameters secured to said cam shaft, the smaller of said cams being provided with a swell which projects beyond the edge of the larger cam and the larger cam being provided with a recess the bottom of which lies flush with the main edge of the smaller cam, a pivoted contact arm provided with a roller, means for biasing said arm to a position in which said roller constantly engages the periphery of one or the other of said cams, two flexible contact fingers attached to said contact arm, and two fixed contact members cooperating with said flexible contact fingers respectively, the parts being so proportioned that when said cam shaft is rotated to a position in which said roller engages the main edge of the larger cam both fingers are out of engagement with said fixed contact members but that when said cam shaft is rotated to a position in which said roller rides up on the swell on the smaller cam one of said fingers engages one of said fixed contact members to close one contact and that when said cam shaft is rotated to the position in which said roller enters the notch in the larger cam the other of said fingers engages the other of said fixed contact members to close another contact.

2. A circuit controller comprising a casing, a main operating shaft journaled in said casing, a first bracket secured to said main operating shaft and provided with two upwardly extending arms, a gear segment secured to the upper ends of said arms, a cam shaft journaled in said casing, a pinion on said cam shaft meshing with said gear segment, two substantially circular cams of different diameters secured to said cam shaft, the smaller of said cams being provided with a swell which projects beyond the edge of the larger cam and the larger cam being provided with a recess the bottom of which lies flush with the main edge of the smaller cam, two ribs projecting from the opposite sides of said casing, a panel of insulating material secured to said ribs, three terminal posts mounted on said panel, a second bracket secured to said panel by a first one of said terminal posts and provided with two arms which extend outwardly from said panel, a pin mounted in the arms of said second bracket, a contact arm pivoted on said pin, a roller on said arm, means for biasing said arm to a position in which said roller constantly engages the periphery of one or the other of said cams, two fixed contact members one secured to said panel by each of the remaining terminal posts, and two flexible contact fingers secured to said arm and cooperating with said two fixed contact members respectively, the parts being so proportioned that when said cam shaft is rotated to a position in which said roller engages the main edge of the larger cam both fingers are out of engagement with said fixed contact members but that when said cam shaft is rotated to a position in which said roller rides up on the swell on the smaller cam one of said fingers engages one of said fixed contact members to close one contact and that when said cam shaft is rotated to the position in which said roller enters the notch in the larger cam the other of said fingers engages the other of said fixed contact members to close another contact.

3. A circuit controller comprising a main operating shaft, a gear segment secured to said main operating shaft, a cam shaft, a pinion secured to said cam shaft and meshing with said gear segment, a cam mounted on said cam shaft and a contact operated by said cam.

In testimony whereof I affix my signature.
GLEN V. JEFFERSON.

CERTIFICATE OF CORRECTION.

Patent No. 1,848,349.   Granted March 8, 1932, to

GLEN V. JEFFERSON.

It is hereby certified that error appears in the printed specification of the above numbered patent requiring correction as follows: Page 4, strike out lines 16 to 22, comprising claim 3; page 3, after line 67, insert the following as claim 1:-

1. A circuit controller comprising a main operating shaft, a bracket secured to said shaft and provided with two upwardly extending arms, a gear segment secured to said arms, a cam shaft, a pinion secured to said cam shaft and meshing with said gear segment, a cam secured to said cam shaft, a pivoted contact arm provided with a roller adapted to cooperate with the periphery of said cam, and means for biasing said arm to the position in which said roller engages the periphery of said cam.;

same page, lines 68 and 99, for the claim numerals "1 and 2" read 2 and 3; and that the said Letters Patent should be read with these corrections therein that the same may conform to the record of the case in the Patent Office.

Signed and sealed this 12th day of April, A. D. 1932.

(Seal)

M. J. Moore,
Acting Commissioner of Patents.